Aug. 4, 1970     W. A. WASEMAN     3,522,855

WASHING MACHINE WITH CLOTHES WEIGHER

Filed Nov. 22, 1967     2 Sheets-Sheet 1

WITNESSES:

INVENTOR
William A. Waseman

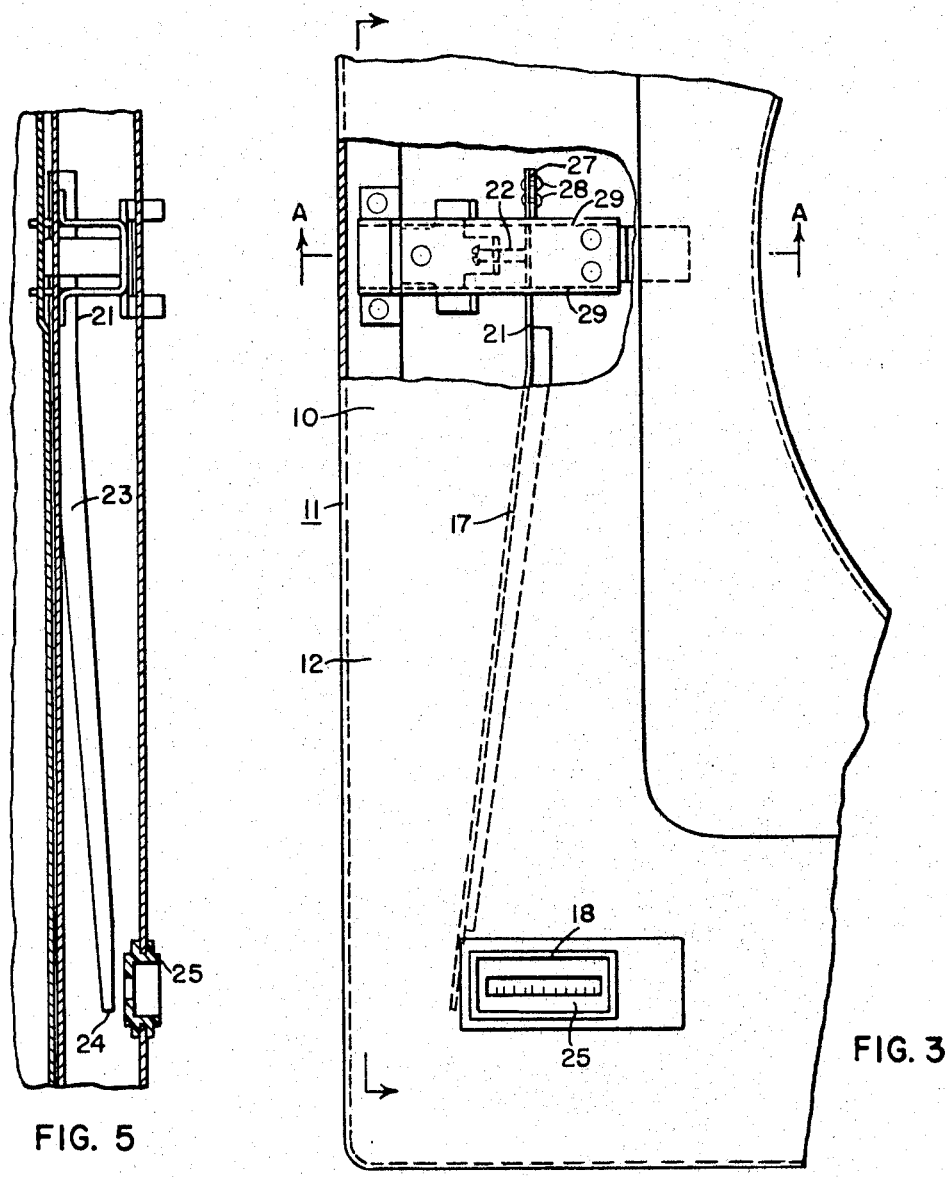
FIG. 5
FIG. 3
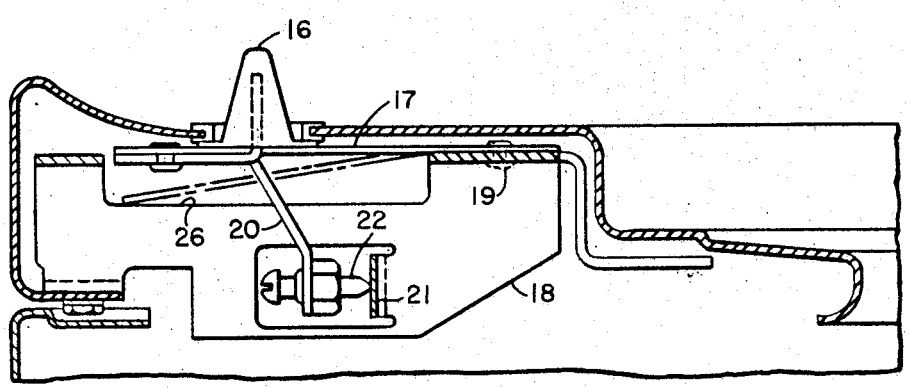
FIG. 4

United States Patent Office 3,522,855
Patented Aug. 4, 1970

3,522,855
WASHING MACHINE WITH CLOTHES WEIGHER
William A. Waseman, Mansfield, Ohio, assignor to Westinghouse Electric Corporation, Pittsburgh, Pa., a corporation of Pennsylvania
Filed Nov. 22, 1967, Ser. No. 685,079
Int. Cl. G01g 19/52
U.S. Cl. 177—144                                   6 Claims

ABSTRACT OF THE DISCLOSURE

A clothes washing machine having weighing mechanism incorporated therein for determining proper load size. The door or closure structure of the machine serves as the weighing platform when it is in the open position adjacent the tub opening thereby facilitating placing of the clothes into the tub after weighing.

BACKGROUND OF THE INVENTION

This invention relates, in general, to laundry apparatus and, more particularly, to washing machines having clothes weighing mechanism for determining proper load size.

In the operation of washing machines it is desirable, from the standpoint of optimum performance, to place in the machine a load of clothes having a specific weight. Where the washer is designed to operate at a single capacity, the user can easily become adept at proper loading thereof, through experience, however when the washer is designed to operate at different capacities, the problem of proper load size cannot easily be reckoned with, to any degree of accuracy.

To cope with the problem, weighing machines have been used in conjunction with operation of laundry equipment. Some such mechanisms have been completely separate from the machine itself while others have been built into the door or lid structure serving to close the tub access opening in the cabinet structure. The inconvenience of transferring clothes from a separate weighing machine to the washing machine will be appreciated. A weighing mechanism built into the door or closure structure is so constructed that a portion of the door structure is used as a platform such that the weighing mechanism is functional only when the door structure is in the closed position. Such an arrangement necessitates opening of the door structure after the weighing operation and also requires means for rendering the weighing mechanism inoperative when not in use, to prevent damage to the mechanism.

Accordingly, it is the general object of this invention to provide a new and improved top loading washing machine having weighing mechanism incorporated therein.

It is a more particular object of this invention to provide, in a top loading washing machine, weighing mechanism which permits determination of proper load size and subsequent loading of the machine in a convenient manner.

Another object of this invention is to provide a new and improved top loading washing machine incorporating weighing mechanism which utilizes the washer door as the platform when it is in an open position adjacent the opening which it serves to close.

SUMMARY

Briefly, the present invention accomplishes the above-cited objects by providing a top loading washing machine having incorporated within the cabinet structure thereof weighing mechanism including an arm in the form of a cantilever spring having a protuberance on the free end thereof which extends through the top wall of the cabinet structure. The door structure which is pivotally attached to the cabinet structure for providing access to the tub serves as a weigh platform which bears against the protuberance (when the door is opened) to thereby deflect the spring an amount proportional to or representing the weight of the clothes.

The deflection of the cantilever spring in a vertical direction, accordingly, a pointer or indicator mechanism is actuated by the spring in a horizontal direction, thus, making it possible to install a scale in the top wall of the cabinet structure for convenience in reading.

Further objects and advantages of the present invention will become more apparent when considered in view of the following drawings and detailed description of the preferred embodiment of the invention.

DESCRIPTION OF THE DRAWINGS

FIG. 3 is a fragmentary view of the top of a washing machine incorporating the invention;

FIG. 4 is a cross-sectional view taken on the line IV—IV of FIG. 3; and

FIG. 5 is a cross-sectional view taken on the line V—V of FIG. 3.

Figure 1:
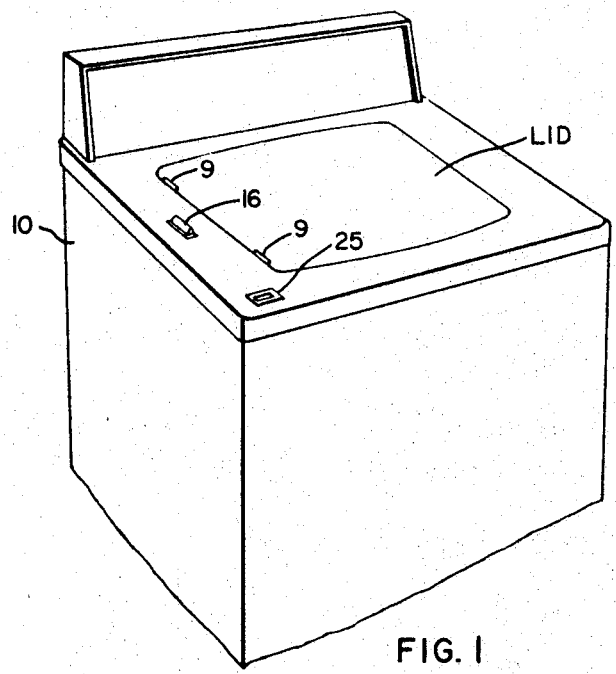
FIG. 1 is a perspective view of a washing machine incorporating the invention.
Figure 2:
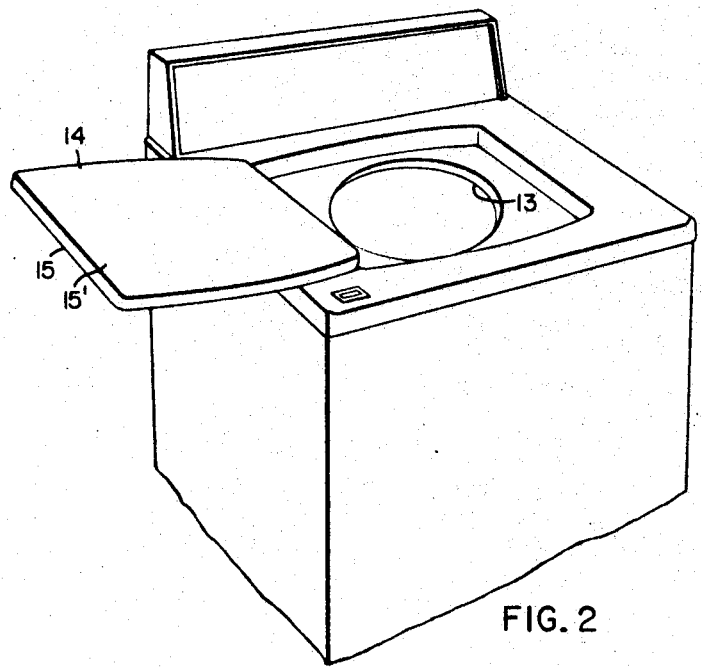
FIG. 2 is a view similar to FIG. 1, but with the washer door open to the position where it serves as a weigh platform.

Referring now to the drawings, especially FIGS. 1 and 2, reference character 10 represents a washing machine comprising a cabinet structure 11 including a top wall 12. The top wall is provided with an aperture 13 therethrough for providing access to a tub member (not shown). To selectively close the opening 13 a door structure 14 is provided which comprises a top panel 15 and a bottom panel 15'. The door 14, in its open position as shown in FIG. 2, serves as a weigh platform for supporting clothes to be weighed in order to determine proper load sizes.

When the door structure 14 is in the open position, the top panel 15 thereof engages a protuberance or fulcrum 16 which extends from the interior of the cabinet structure 11 through the top wall 12 thereof. It can be seen that the door structure 14 is pivotally attached by hinges 9 adjacent the fulcrum 16 so that this may be accomplished. The protuberance 16 is supported by the free end of a cantilever spring 17 which is attached to a support bracket 18 by suitable fasteners such as rivets 19, the bracket 18, in turn, being supported by the cabinet structure in any suitable manner. The spring 17 is calibrated to yield or deflect a predetermined amount in accordance with each unit weight of load supported by the door structure 14.

The deflection or displacement of the spring 17 is in a substantially vertical direction, however, this vertical displacement is converted to horizontal displacement through a bracket 20 which operatively couples the spring 17 to a second spring 21 through an adjustable screw 22. The second spring 21 carries an elongated pointer or indicator 23 which as shown in FIG. 5 extends forwardly toward the front of the machine 10 and upwardly toward the top wall 12 so that the tip 24 thereof underlies a scale 25 calibrated in pounds of clothes. It will be appreciated that any other suitable calibration may be utilized, for example, the indicia may correspond to different capacities of the machine.

The adjustable screw 22 is used as an adjustment for setting the tip 24 at the zero point on the scale 25 in order to compensate for the weight of the door structure 14 as well as compensating for slight variations in the tolerances of parts.

Overdeflection of the spring 17 is prevented through an abutment thereof with shoulders 26 of the bracket 18.

This arrangement will also protect other parts of the mechanism such as the spring 21 (see FIG. 3) since it, too could otherwise be overdeflected. The spring 21 is attached at one end in cantilever fashion to a sidewardly projecting flange 27 integral with the bracket 18. Suitable rivets 28 are used for this purpose. The spring 21 is supported by the flange 27 such that it extends through the sidewalls 29 of the bracket 19 thereby permitting the spring 17 to be mounted centrally of the bracket 18.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed is:

1. Top loading laundry apparatus comprising:
   cabinet structure having a top wall with an opening therethrough for insertion of clothes into a tub supported within said cabinet structure;
   door structure pivotally secured at one end thereof to said top wall in registry with said opening and movable between open and closed positions;
   means including structure cooperating with said door structure in its open position for weighing clothes supported by said door in said open position; and
   wherein said structure cooperating with said door is supported within said cabinet structure and includes a resilient member having a protuberance which projects through said top wall for engagement by said door in said open position.

2. Structure as specified in claim 1 wherein said structure cooperating with said door comprises:
   said resilient member yieldable in proportion to weight of the clothes; and
   pointer means for indicating the weight of the clothes; and means operatively connecting said resilient member and said pointer means for deflecting said pointer means in response to movement of said resilient member in a direction substantially perpendicular to the direction of movement of said resilient member.

3. Structure as specified in claim 2 including:
   indicia bearing structure carried by said top wall and cooperating with said pointer means to indicate the weight of the clothes supported on said door structure.

4. Structure as specified in claim 3 wherein said connecting means includes:
   adjutable means for effecting registry of said pointer with a zero point on said indicia bearing structure.

5. Structure as specified in claim 2 wherein said proportionally yieldable resilient member comprises a leaf spring secured at one end and said protuberance comprises a button carried by the free end of said spring.

6. Structure as specified in claim 5 wherein said pointer means comprises a leaf spring supported at one end; and
   said connecting means deflects the free end of said pointer means in proportion to the movement of said resilient member.

References Cited
UNITED STATES PATENTS

| | | | |
|---|---|---|---|
| 2,412,270 | 12/1946 | Johnston | 177—245 X |
| 2,554,672 | 5/1951 | Johnston | 177—245 X |
| 2,656,236 | 10/1953 | Wasemann | 177—245 X |
| 2,683,985 | 7/1954 | Smulski | 177—229 X |
| 3,127,948 | 4/1964 | Nitenson | 177—144 |

RICHARD B. WILKINSON, Primary Examiner

G. H. MILLER, Jr., Assistant Examiner

U.S. Cl. X.R.
177—245